June 5, 1934.  W. D. ARCHEA  1,961,124
MILLING MACHINERY
Filed May 20, 1929  7 Sheets-Sheet 1

Inventor
WALTER D. ARCHEA
By AHKParsons
Attorney

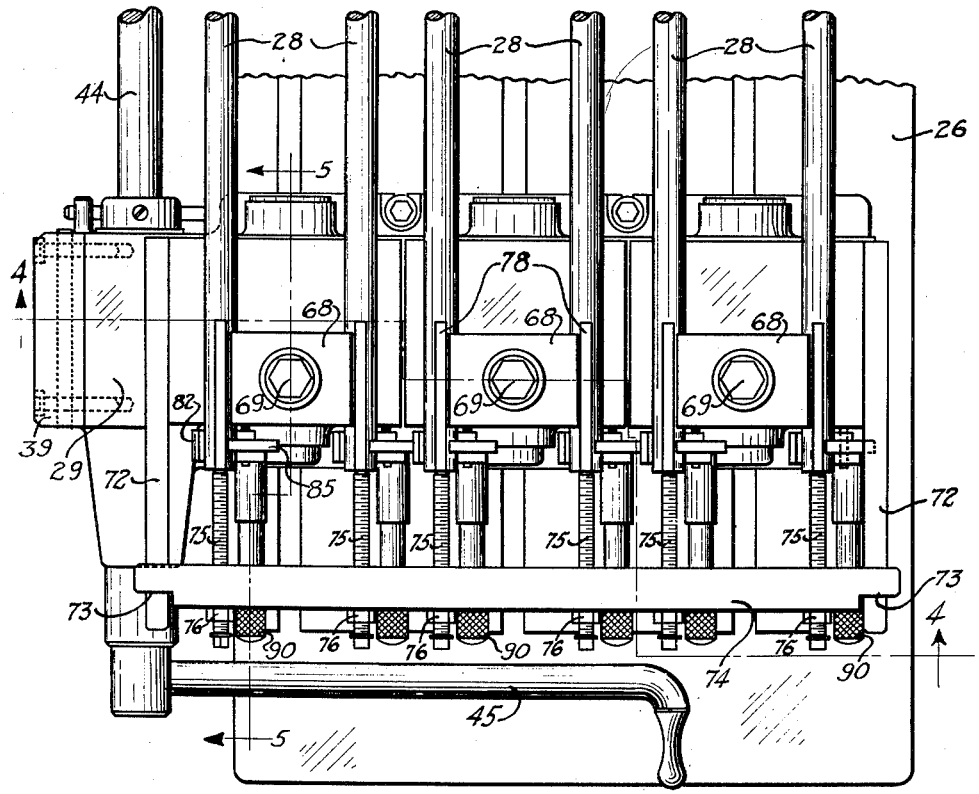
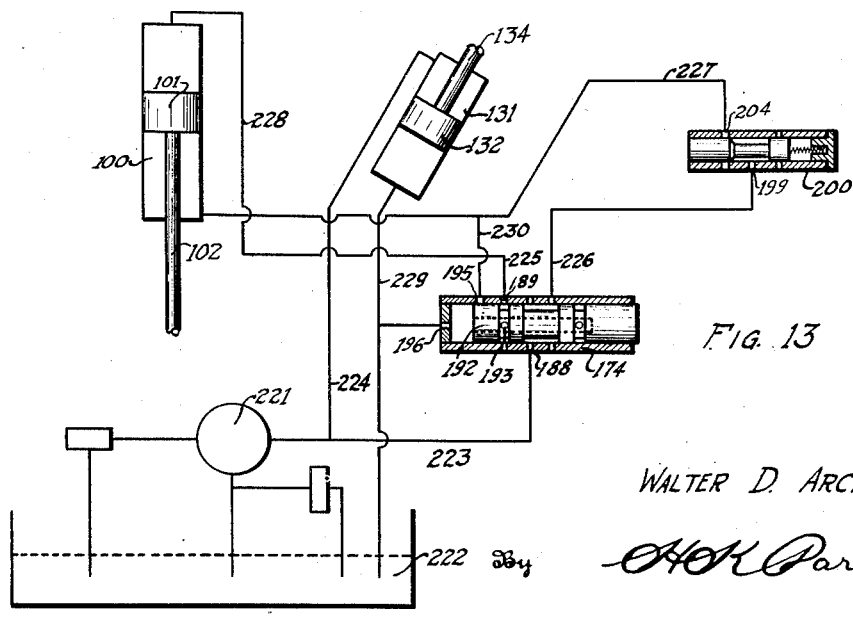

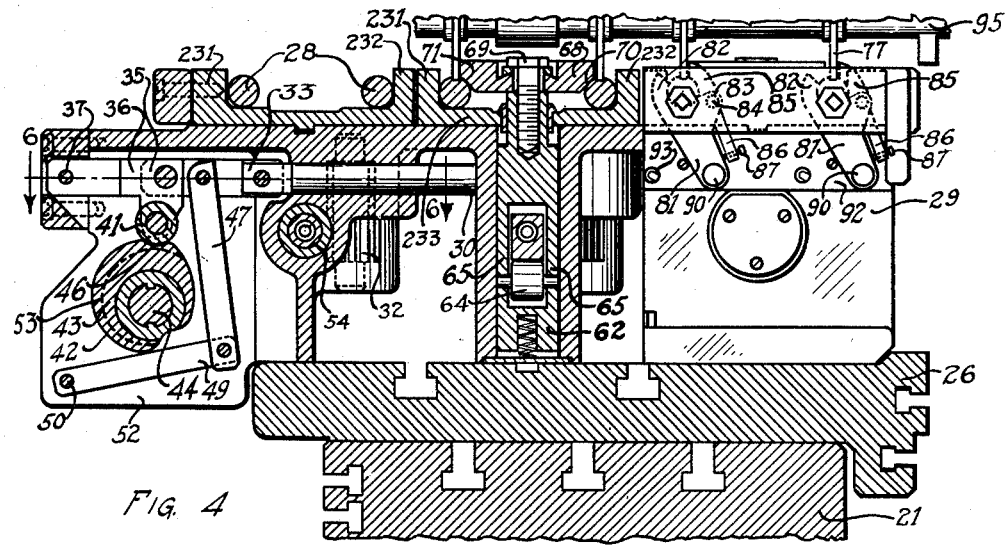
FIG. 4
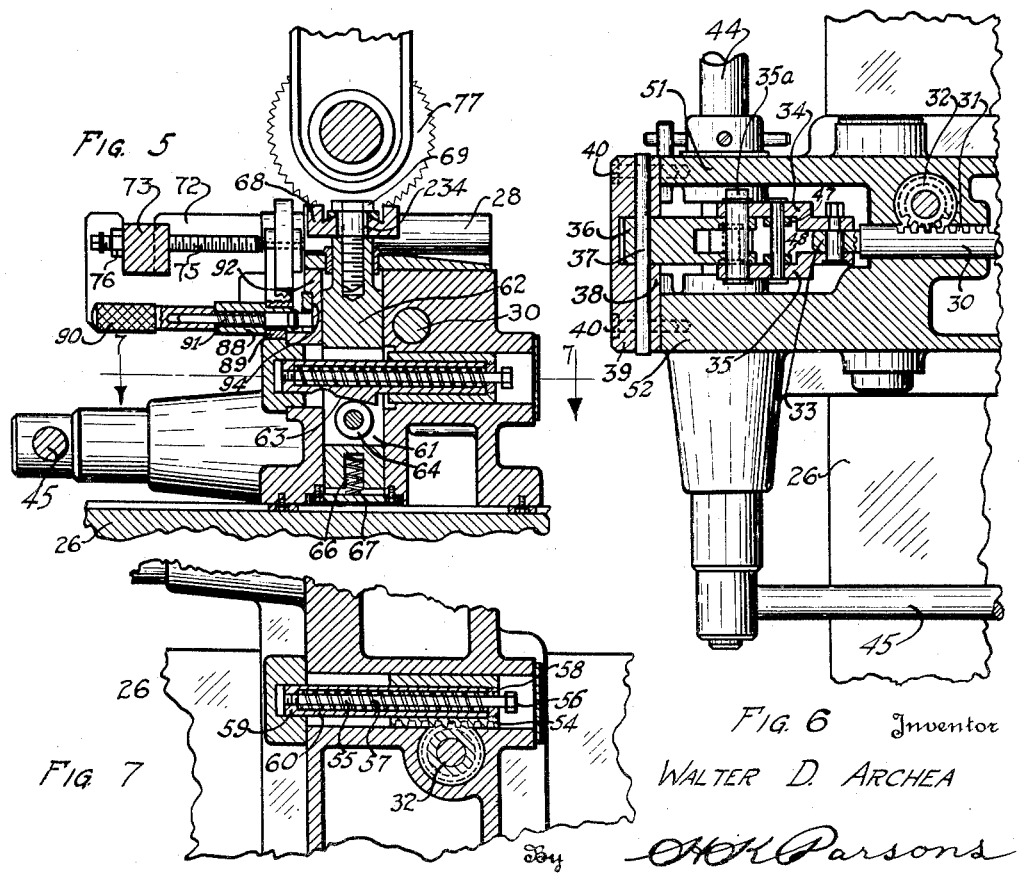
FIG. 5
FIG. 7
FIG. 6
Inventor
WALTER D. ARCHEA
By AHKParsons
Attorney

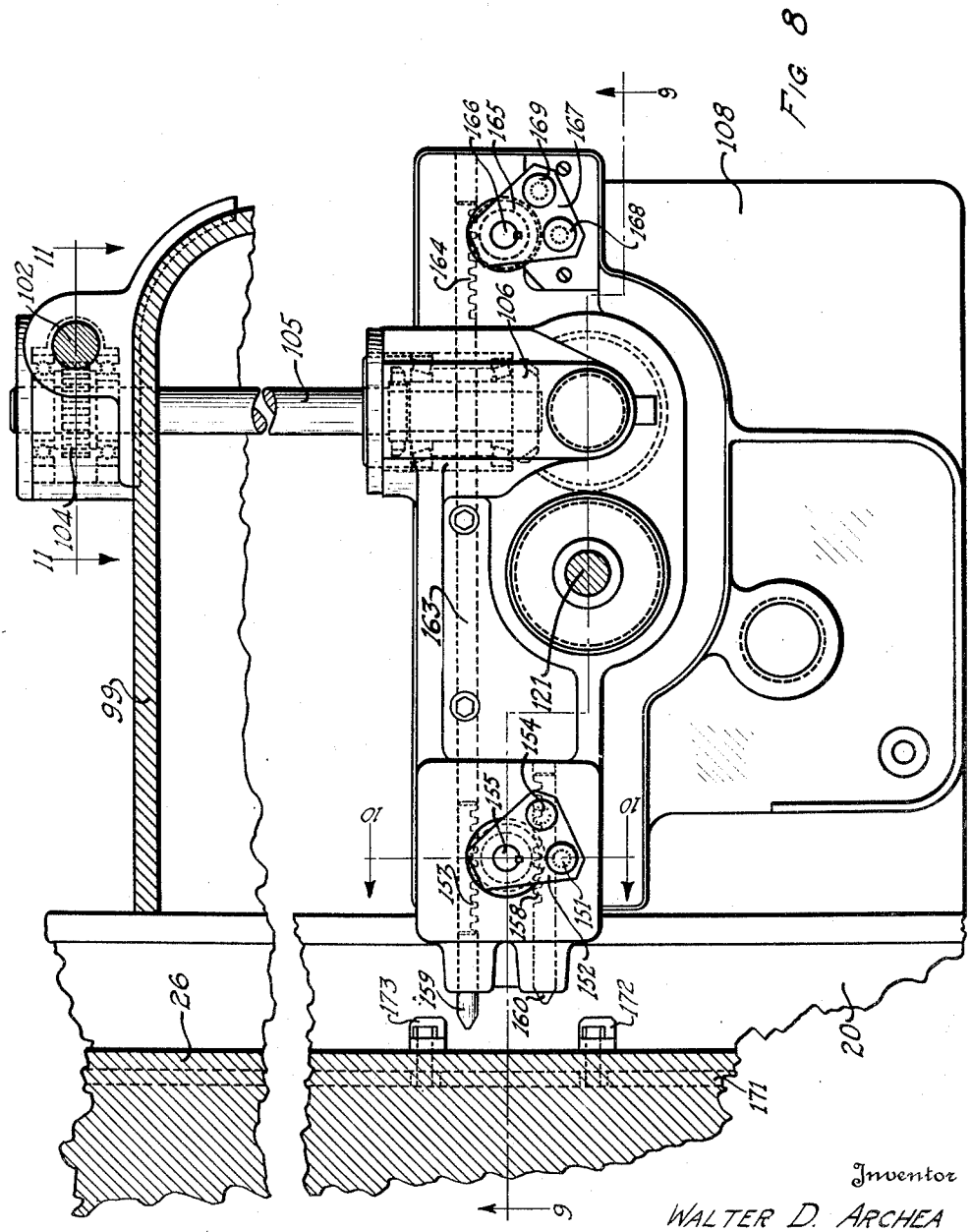

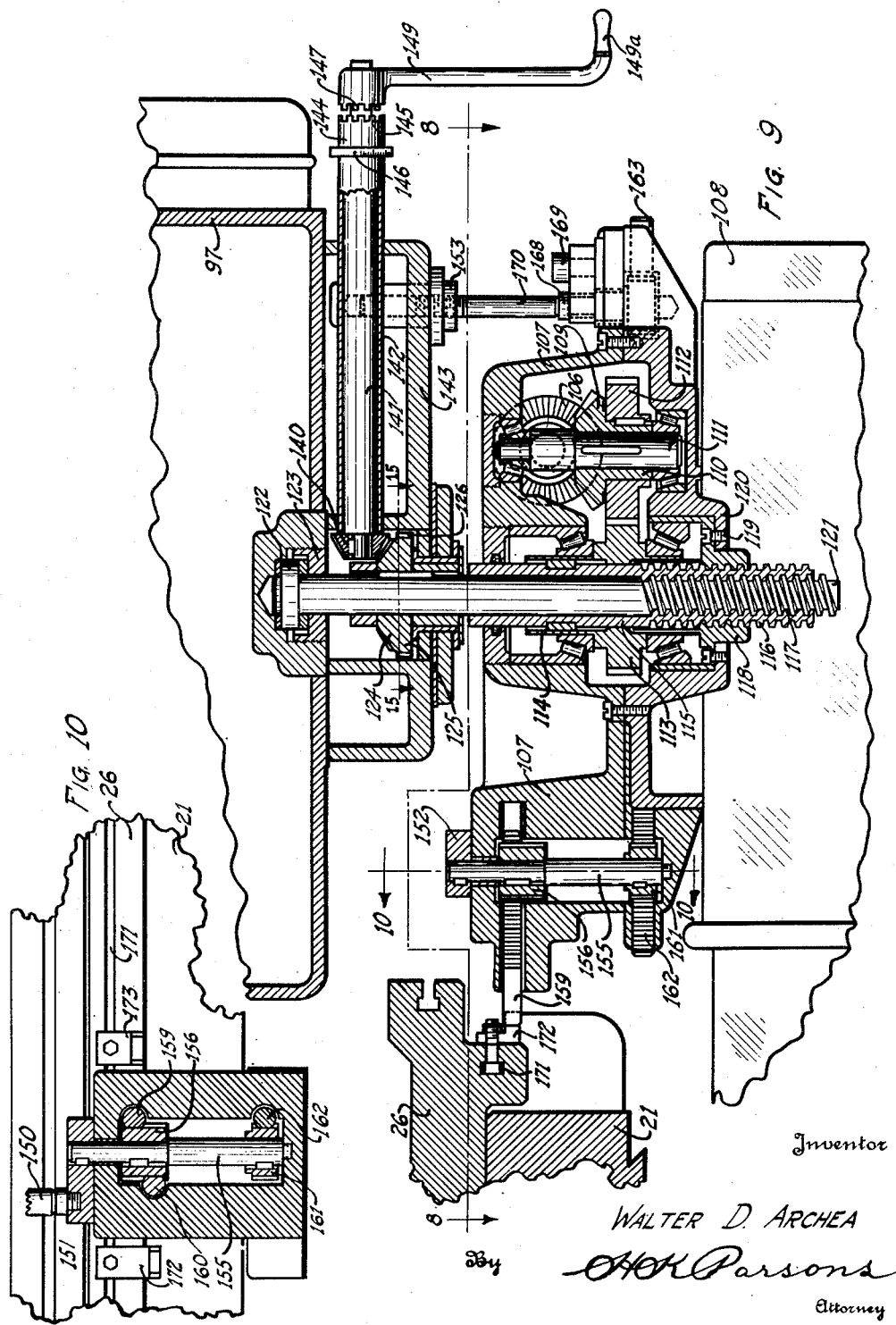

June 5, 1934.   W. D. ARCHEA   1,961,124
MILLING MACHINERY
Filed May 20, 1929   7 Sheets-Sheet 6
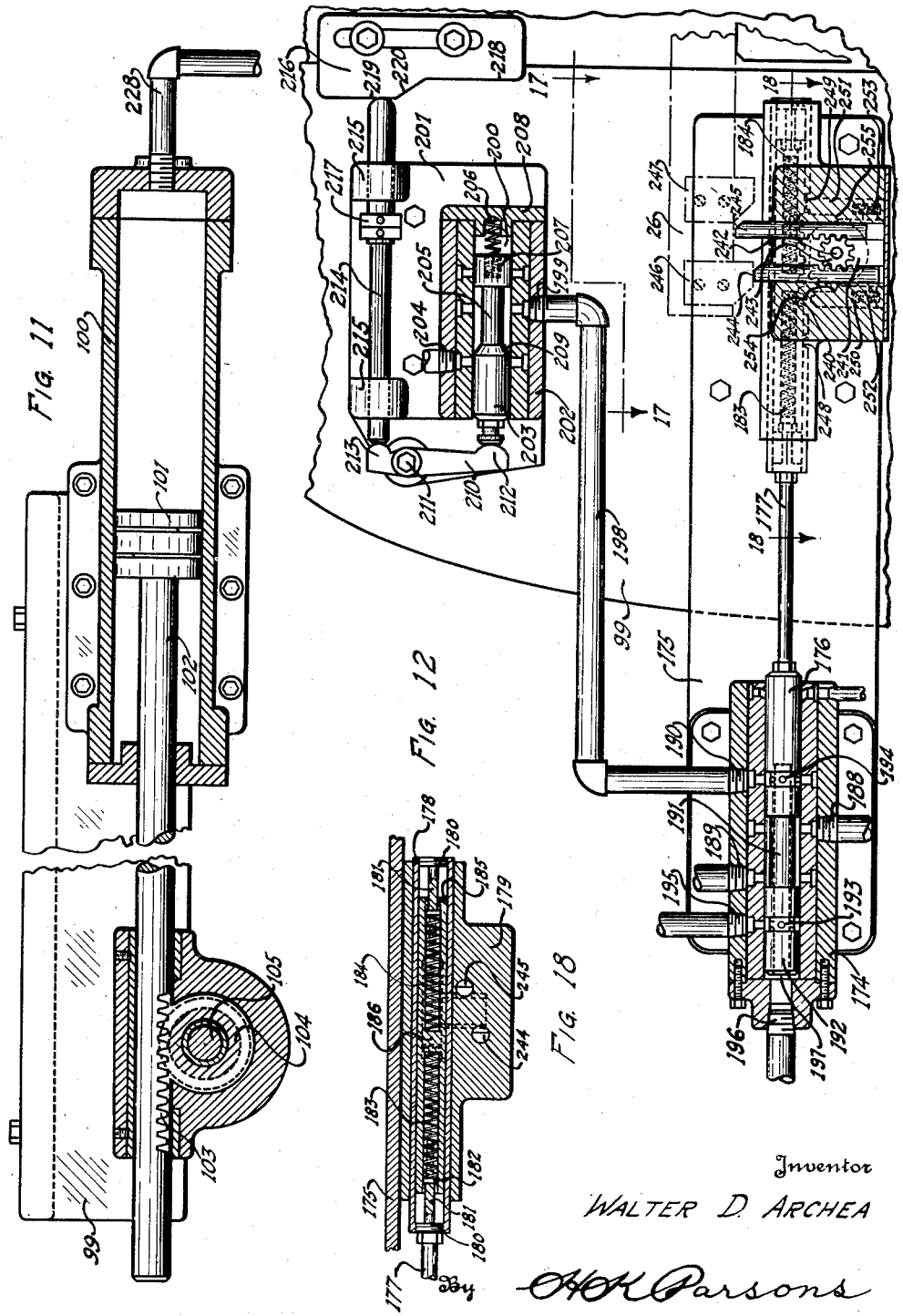
Inventor
WALTER D. ARCHEA
By A. H. K. Parsons
Attorney June 5, 1934.  W. D. ARCHEA  1,961,124
MILLING MACHINERY
Filed May 20, 1929  7 Sheets-Sheet 7

Inventor
WALTER D. ARCHEA
By AHParsons
Attorney

Patented June 5, 1934

1,961,124

UNITED STATES PATENT OFFICE 1,961,124

MILLING MACHINERY

Walter D. Archea, Cincinnati, Ohio, assignor to The Cincinnati Milling Machine Company, Cincinnati, Ohio, a corporation of Ohio Application May 20, 1929, Serial No. 364,369

26 Claims. (Cl. 90—21.5)

This invention relates to improvements in milling machines and particularly to automatic machines having a predetermined cycle of operation.

An object of this invention is the provision of a machine for performing a series of operations on a work piece or a plurality of work pieces at spaced portions throughout the length of said work piece and wherein the amount of cut or depth of cut may be varied or the cuts may be performed in axial alignment or at angles to one another.

A further object of the invention is the provision of a machine for cutting a plurality of keyways in shafts having a plurality of diameters which keyways are to be cut to the same depth below the surface of each diameter and at angles one to the other.

A further object of the invention is the provision of a machine wherein a plurality of work pieces are simultaneously clamped and unclamped in position and in relation to the cutting tools.

Other objects and advantages of the present invention should be readily apparent by reference to the following specification considered in conjunction with the accompanying drawings forming a part thereof and it will be understood that any modifications may be made in the specific details of construction and combination and arrangement of parts hereinafter described within the scope of the appended claims without departing from or exceeding the spirit of the invention.

In the drawings:

Figure 3 is an enlarged fragmentary plan view of one end of the fixture supporting the work pieces, as seen from line 3—3 of Figure 1.

Figure 4 is a sectional view taken on line 4—4 of Figure 3.

Figure 5 is a fragmentary sectional view taken on line 5—5 of Figure 3.

Figure 6 is a fragmentary sectional view taken on line 6—6 of Figure 4.

Figure 7 is a fragmentary sectional view taken on line 7—7 of Figure 5.

Figure 8 is an enlarged fragmentary horizontal sectional view taken substantially on line 8—8 of Figure 2 and on Figure 9.

Figure 9 is a fragmentary vertical sectional view taken on line 9—9 of Figure 8.

Figure 10 is a fragmentary sectional view taken on line 10—10 of Figure 9.

Figure 11 is a fragmentary sectional view taken on line 11—11 of Figure 8.

Figure 12 is a fragmentary sectional view taken on line 12—12 of Figure 2.

Figure 13 is a diagrammatic view showing the hydraulic control circuit of the various parts or units.

Figure 18 is a sectional view taken on line 18—18 of Figure 12.

Throughout the several views of the drawings the same reference characters are utilized to indicate the same part.

Figure 1:
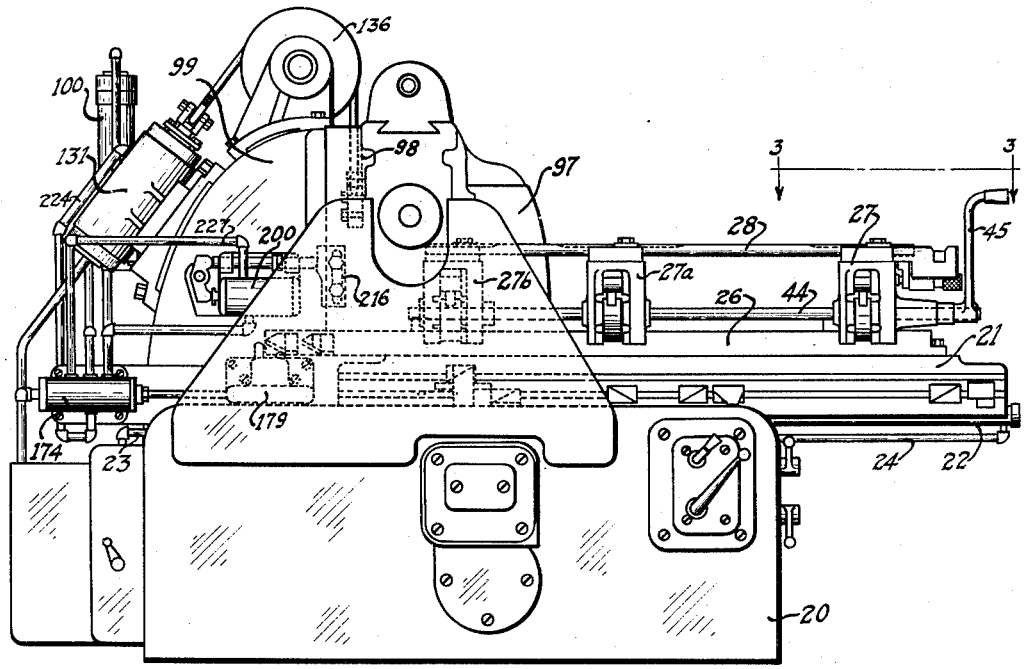
Figure 1 is a front elevation of machine embodying this invention.
Figure 2:
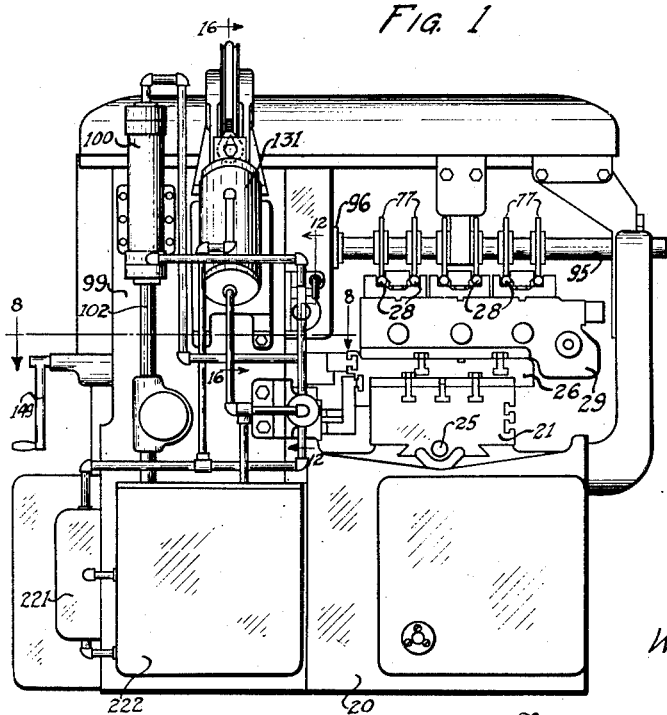
Figure 2 is an end elevation thereof as seen from the left hand side of Figure 1.
Figure 16:
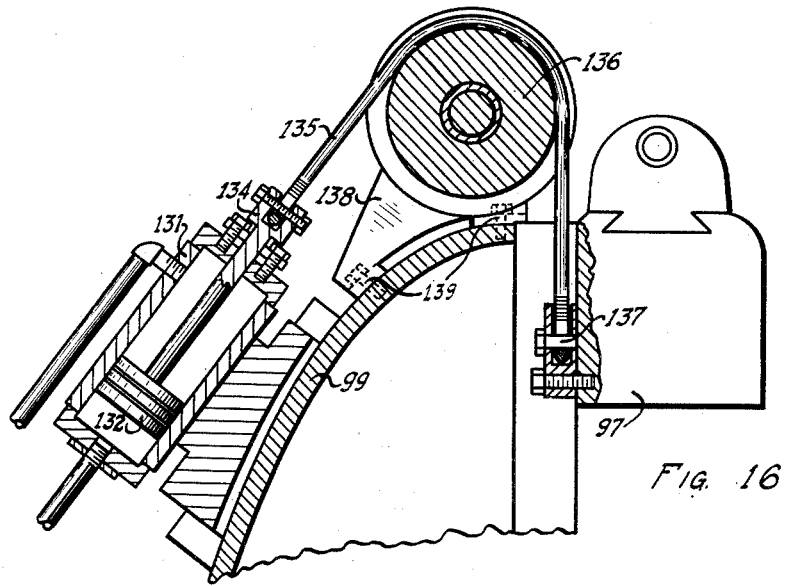
Figure 16 is a fragmentary sectional view taken on line 16—16 of Figure 2.
Figure 15:
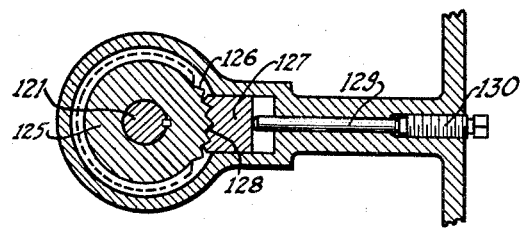
Figure 15 is a fragmentary sectional view taken on line 15—15 of Figure 9.
Figure 17:
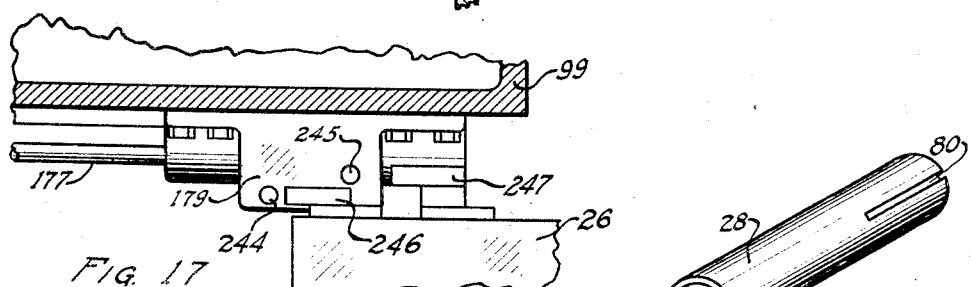
Figure 17 is a view taken on line 17—17 of Figure 12.

The reference character 20 indicates the bed having ways formed at the upper end thereof for supporting the reciprocating table 21 which is secured to one end of piston rod 22 reciprocable in cylinder 23. Pipes 24 and 25 are employed to convey fluid under pressure to opposite ends of the cylinder 23 for actuating the piston therein secured to the other end of the piston rod 22.

Mounted on the upper surface of the table 21 is a base or second table 26 of a length substantially equal to the length of the table and provided with a plurality of clamping mechanisms 27, 27a and 27b for supporting and clamping a plurality of work pieces 28, in this instance shafts. The clamping mechanisms being duplicates of one another it is deemed only one of them need be described here in full. The clamping mechanism 27 comprises a housing 29 secured to and extending transversely of the second table 26 having a rack bar 30 reciprocably mounted therein and provided with rack teeth 31 at intervals throughout its length. These rack teeth mesh with elongated pinions or gears 32. One end 33 of the rack bar is reduced and is pivotally connected with one end of a pair of links 34 and 35 which have their other ends pivotally connected with a bifurcated lever 36. This lever in turn is pivoted at 37 between the arms 38 of an end plate 39 secured by screws or the like 40 to the bracket or housing 29. A roller 41 is carried by the furcations of the lever and is adapted to contact with the periphery 42 of a cam 43 carried by a rock shaft 44 having an operating lever 45 on its one end. The cam 43 is provided with a depression 46 to receive the roller 41 to lock the rack bar 30 in position when the work pieces are clamped and being operated upon.

The links 34 and 35 have respectively pivotally secured to them links 47 and 48 whose lower ends are pivotally secured to arms 49. The arms in turn are pivoted at 50 to sides 51 and 52 of the housing 29. The arms 51 and 52 are adapted to be engaged by a second cam face 53 on the cam 43.

As the shaft 44 is rocked in a counter-clockwise direction by the lever 45 the cam face 53 engages arms 49 rotating them about their pivot 50 depressing links 47 and 48. This movement of the links pulls the pivot 35a downward causing the reduced end 33 of the rack bar to approach the pivot pin 37 thereby reciprocating the rack bar 30 to the left as seen in Figure 4. The reverse rocking or rotation of shaft 44 causes the cam face 42 of the cam 43 to push the pivot 35a outwardly forcing the end 33 of the rack away from the pivot pin 37 and reciprocating the rack bar to the right to the position illustrated in the drawings. From the foregoing description it will be noted that lever 36 and links 34 and 35 constitute a toggle joint operated by the cam faces 42 and 53 on the cam 43 for reciprocating the rack bar 30 and rotating pinions 32.

The elongated gear or pinion 32 meshes with a short sleeve rack 54 through which a bolt or stud 55 having a head 56 extends. An expansion spring 57 surrounds the bolt or stud 55 and has its one end in abutment with a plug 58 threaded in one end of sleeve rack 54 and its other end in abutment with the base 59 of sleeve 60 which telescopes within the rack sleeve 54. Sleeve 60 extends through an opening 61 formed in a vertically reciprocable clamp bar 62 and is formed with a cam 63 on its under face.

A roller 64 is carried by the clamp bar 62 between the sides 65 of the opening 61 therein. This roller 64 is adapted to be engaged by the cam 63 for moving the clamp bar 62 in one direction. A recess 66 is formed in the bottom of the bar 62 for the reception of an expansion spring 67 which raises the bar 62 when the cam 63 is retracted. A clamp shoe 68 is secured by means of a cap screw 69 or the like to the upper end of clamp bar 62. This clamp shoe is provided with oppositely inclined bevel faces 70 and 71 which engage a work piece or shaft on opposite sides of said shoe for clamping said work pieces between the bevel faces 70 and 71 and the flanges 231 and 232 of the channel like work receiving member 233 mounted on the housing 29. The work clamping shoes 68 are provided with a relatively large opening 234 through which the bolt 69 or the like passes so that should one or the other work piece be slightly larger and be engaged before the remaining one the shoe can be slightly canted to engage all the work pieces and exert an equal clamping pressure thereon.

The shifting of rack bar 30 to the left as seen in Figure 4 through the rack teeth 31 rotates pinion 32 which pinion in turn shifts rack sleeve 54 to the right as seen in Figures 5 and 7 until screw plug 58 engages head 56 on bolt or stud 55. Continued movement of rack sleeve 54 moves bolt or stud 55 and with it telescopic sleeve 60 and cam 63. As soon as cam 63 is moved away from roller 64, expansion spring 67 forces upwardly the clamp bar 62 and clamp shoe 68 releasing the work pieces 28. Conversely, when the rack bar 30 is shifted to the right the rack sleeve 54 is shifted to the left tending to compress spring 57 causing said spring to actuate the telescopic sleeve 60 and cam 63 lowering the clamp bar 62 against the resistance of spring 67 and rigidly clamping or securing the work pieces.

To properly position the work pieces 28 lengthwise of the table 26 the housing 29 of clamp mechanism 27 is provided on each side thereof with arms 72 provided in their forward ends with notches 73 for the reception of abutment bar 74. This abutment bar 74 has extending through it a plurality of adjustable abutments 75 here illustrated as headed screws. Suitable lock nuts 76 are provided which lock the adjustable abutments 76 in position. One abutment 75 is in axial alignment with each work piece and limits the axial movement of said work piece to properly position same relative to the milling cutter 77.

Figure 14:
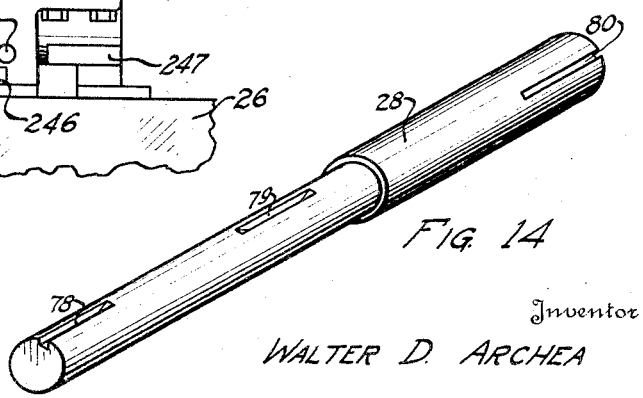
Figure 14 is a perspective view of a finished work piece produced on a device of this invention.

In Figure 14 is shown a finished work piece 28 having three keyways 78, 79 and 80 formed therein. It will be noted that the keyways 78 and 79 are in axial alignment while keyway 80 is offset or at an angle to the axial line of the first two keyways. In order to perform this operation without removing the work pieces from the machine the following mechanism is utilized.

Each of the work pieces is provided with an indexing mechanism comprising an arm 81 having a jaw portion 82 for engagement with one side of the work piece. The arm 81 is also provided with an ear 83 through which pivot pin 84 is extended. The pivot pin 84 also passes through a second jaw member 85 provided with a lug 86 through which a set screw or clamping screw 87 projects. The clamping screw 87 has one end in abutment with the arm 81 and as said screw is threaded through the lug 86 the jaw member 85 is rotated about pivot 84 and against the opposite side of a work piece for clamping the work piece between itself and the jaw portion 82. Secured in the arm 81 is a sleeve 88 through which a spring pressed plunger 89 passes having a knurled operating handle 90 pinned or secured thereto for operating the plunger against the yielding tension of spring 91. An index plate 92 having stops 93 and 94 is secured to the front wall of the housing 29. These stops 93 and 94 cooperate with the plunger 89 for properly locating the point at which the operation on the work piece is to be performed.

In the utilization of the locating and indexing mechanism each work piece has first secured to it an indexing mechanism and it is then mounted in the clamping mechanisms with one end in abutment with the positioning stops 75 and with the plunger 89 against one of the stops 93 or 94 and illustrated herein as against stop 94. The keyway or portions 78 and 79 are then formed, when the plunger is shifted from stop 94 to stop 93 thereby partially rotating the work piece whereupon the keyway or portion 80 may be formed offset or at an angle to the portions 78 and 79.

The cutters or tools 77 are carried by an arbor 95 rotated by the spindle 96 journaled in spindle carrier 97. This spindle carrier 97 is adapted to be vertically reciprocated on ways 98 provided on the upright or column 99 rising above the bed 20 and adjacent thereto. Manual means and power means, automatically controlled, for vertically reciprocating the spindle carrier as well as means for limiting this reciprocating movement are provided and are illustrated in Figures 8 to 13 inclusive.

Mounted on the side of the upright or column 99 is a cylinder 100 for piston 101 adapted to be reciprocated by hydraulic pressure. The piston rod 102 of the piston 101 is provided on one end with rack teeth 103 meshing with gear or pinion 104 carried on one end of shaft 105 which extends laterally of the column or upright 99. On the other end of shaft 105 is a bevel gear 106 contained within a stationary housing 107 carried by the main bed 108 of the machine. The bevel gear 106 meshes with a second bevel gear 109 which has a hub 110 thereon and through which a stub shaft 111 extends which is suitably mounted in anti-friction bearings. Keyed to the hub 110 of gear 109 is a spur gear 112 meshing with spur gear 113 having a sleeve 114 which is journaled in anti-friction bearings. The gear 113 and sleeve 114 are keyed to a sleeve 115 having external threads 116 and internal threads 117. The external threads 116 are threadedly received in a nut 118 fixedly secured by cap screws or the like 119 to the base 120 of the housing 107. Threadedly received by the internal threads 117 of sleeve 115 is an elevating screw 121 provided with an anti-friction thrust bearing 122 at its upper end. The elevating screw 121 is rotatably but not translatably secured to spindle carrier by a nut 123. A bevel gear 124 is keyed to the elevating screw 121 so as to move therewith and the gear is provided with a collar or flange 125 whose periphery is formed with a plurality of serrations or teeth 126. A locking pawl 127 having serrations or teeth 128 inter-meshing with the serrations or teeth 126 is provided for locking the elevating screw 121 against rotation. The locking pawl 127 is in abutment with a plunger 129 which is forced forward by means of screw or the like 130 to cause the engagement of the serrations or teeth 126 and 128.

When it is desired to reciprocate the spindle carrier 97 by power the elevating screw 121 is first locked against rotation by means of lock pawl 127 whereupon fluid under pressure is introduced into one end of cylinder 100 on one side of piston 101 to reciprocate the piston rod 102 thereof. This reciprocation of piston rod 102 through the intermeshing of rack teeth 103 and pinion or gear 104 rotates shaft 105 and through the inter-meshing of bevel gears 106 and 107 and spur gears 112 and 113 rotates the sleeve 115. Rotation of the sleeve 115 through the intermeshing of the internal threads 117 and screw 121 will cause an axial movement of the elevating screw in addition to that caused by the movement of sleeve 115. It should be noted that by this construction the benefits of a double screw threaded elevating screw is obtained and at the same time manual means may be provided for manually adjusting the spindle carrier and for setting the parts to perform a certain cycle of operation which manual means will be described in detail later.

The vertical reciprocation of the spindle carrier takes place while the table 21 is laterally reciprocating beneath the cutters. This spindle carrier is relatively large and of considerable weight having a rather large standing inertia and in order to accomplish the vertical reciprocation of the spindle carrier with the least possible delay suitable mechanism has been provided including a cylinder 131 secured to the side of the column or upright 99 in which a piston 132 is contained. The piston rod 133 of the piston 132 has a yoke 134 on its free end for securing to it a cable or the like 135 which cable passes around a sheave 136; the other end of the cable 135 is secured by means of a bolt or other fastening means 137 to the side of the spindle carrier 97 adjacent the column 99. The sheave is mounted on the upper end of the column by means of a bracket 138 secured thereto by bolts or the like 139 in such a position that the cable hangs vertically and exerts a direct upward pull on the spindle carrier.

In order to utilize the foregoing mechanism fluid under pressure is constantly in the cylinder 131 tending to move the piston 132 in the direction to raise or lift the spindle carrier and cutters upwardly. This pressure however, merely balances the weight of the spindle carrier and tends to overcome the standing inertia thereof so that when pressure is applied on one side of piston 101 the spindle carrier moves immediately. From the foregoing it will be noted that an hydraulic counter-balance has been provided for the spindle carrier and associated parts.

When it is desired to manually raise or lower the spindle carrier for adjusting or setting same the screw 130 is backed away to relieve the pressure on the locking pawl 127 thus allowing the elevating screw to be free to rotate whereupon the following mechanism may be utilized. Meshing with bevel gear 124 is a bevel pinion 140 keyed to the end of a shaft 141 rotatably journaled in a sleeve 142 carried by an extended housing 143 integral with the spindle carrier 97. Mounted to rotate relative to the sleeve 142 is a clutch sleeve 144 having clutch teeth 145 on one end and graduations 146 on the other end thereof. The clutch sleeve 144 is keyed to the shaft 141 so as to rotate therewith and the teeth 145 thereof are adapted to mesh with clutch teeth 147 formed on clutch member 149 integral with the handle or lever 149a which handle is loosely mounted on shaft 141. The clutch teeth 147 and 149 are normally disassociated to prevent accident to the operator and are only engaged when it is desired to manually adjust the spindle carrier.

Rotation of the handle 149 after the clutch teeth 145 and 147 have been engaged rotates shaft 141 and through the bevel gears 140 and 124 cause a rotation of elevating screw 121. This rotation of the elevating screw causes same through intermeshing of its screw threads with the internal threads 117 of sleeve 115 to vertically move thereby reciprocating the spindle carrier. The sleeve 115 at this time is locked against rotation by the fluid within the cylinder 100 on both sides of piston 101 since to rotate the sleeve would through the intermeshed gears and rack reciprocate the piston rod 102 and compress the fluid within the cylinder 100 which has no means of escape at this time.

The following mechanisms are utilized for controlling and limiting the downward movement of the spindle carrier and cutters. Adjustably screwed into the housing 143 is an adjustable stop 150 which contacts with an abutment block 151 carried by plate 152. In addition to the stop block 151, the plate 152 carries a second stop block 154 of different height than block 151 which stops the downward movement of the spindle carrier and cutters at a different height above the center of the work piece. The plate 152 is secured to a shaft 155 which passes vertically through the housing 107. A pinion 156 is secured to the shaft 155 intermediate its ends and has meshing with it at diametrically opposite points rack teeth 157 and 158 formed respectively on plungers 159 and 160. The plungers are located in spaced parallel planes one above the other. A pinion 161 is also carried by the shaft 155 at its lower end which meshes with rack teeth 162 formed in one end of a rack bar 163 extending parallel with but in a plane below the planes of the plungers 159 and 160. The other end of the rack bar 163 has also formed on it rack teeth 164 meshing with a pinion 165 secured to a second vertical shaft 166 operable in a vertical plane parallel with the shaft 155. This shaft 166 also carries a plate 167 carrying a pair of stop blocks 168 and 169 corresponding respectively to stop blocks 151 and 154 adapted to be engaged by adjustable stop 170. The adjustable stops 150 and 170 are secured in adjusted position by lock nuts 153. To operate the stop blocks to bring the proper block beneath the adjustable stops, the second table or base member 26 is provided with a T slot 171 for adjustably carrying a pair of dogs 172 and 173. The dogs 172 and 173 are mounted in planes one above the other in alignment with the plungers 159 and 160.

The foregoing mechanisms for limiting the downward movement of the spindle carrier and cutters is utilized when it is desired to form a deeper cut or cuts on a certain portion or portions of the work piece, or when the depth of cut is to be the same but on a work piece having different sizes throughout its length. For example the work piece, as shown in Figure 14, has the portion wherein the keyway 80 is formed on a larger diameter than the rest of the work and in order to cut the keyway to the same depth as the keyways 78 and 79 the downward movement of the cutters must be stopped sooner. To accomplish this change of movement of the cutters while the work piece is reciprocating there-beneath, the dog 172 is set to engage and shift plunger 159 which through its rack teeth 157 and pinion 156 partially rotates the plate 152 and brings the stop block 154 beneath the stop 150. At the same time through the inter-meshing of rack teeth 162 with the pinion 161 the rack bar 163 is shifted for partially rotating the plate 167 through the rack teeth 164 and pinion 165 thereby bringing the stop block 169 beneath the stop 170. The different height of stop blocks 168 and 169 is clearly shown in Figure 9 and it is evident that they will vary the depth to which the cutters and spindle carrier will descend.

The mechanism for controlling the flow of fluid under pressure for vertically reciprocating the spindle carrier are illustrated in Figure 12 to which attention is now specifically invited. The main valve casing 174 is carried by a bracket 175 secured to the upright or column 99 and contains reciprocating valve 176. The valve stem 177 thereof is connected with a sleeve 178 slidable through housing 179 carried by the bracket 175. End plugs 180 are carried by the opposite ends of the sleeve 178 and each is provided with tongue 181 abutting blocks 182 carried in opposite ends of expansion springs 183 and 184. Springs 183 and 184 are mounted within a sleeve 185 adapted to slide within the sleeve 178 and the springs have their adjacent ends abutting on opposite sides of a partition 186 located centrally of the sleeve 185. The sleeve 185 is provided with rack teeth 240 enmeshed with the teeth of a segmental gear 241 secured to a rotatable shaft 242.

A pinion 243 is also secured to the shaft 242 and meshes on opposite sides, but in offset relation with vertically shiftable rack plungers 244 and 245 adapted to be respectively shifted by dogs 246 and 247 carried by the base or second table 26. The outer sleeve member is provided with an opening through which the segmental gear extends and the sleeve is provided on opposite sides of the opening with a notch 248 and 249 in alignment with pawls 250 and 251 yieldably urged upwardly by expansion springs 252 and 253. Each of the pawls 250 and 251 is provided with a ledge 254 and 255 adapted to be engaged by the end tooth on each side of the segmental gear for shifting said pawls against the urge of the springs 252 and 253. This device for shifting the main valve may be termed a load and fire mechanism and as the table reciprocates the dog 247 depresses rack plunger 245 rotating pinion 243, shaft 242 and segmental gear 241 thereby shifting inner sleeve 185 to the right as seen in Figure 18. Outer sleeve 178 does not move because it is held against movement by pawl 251 which is seated in notch 249, therefore, spring 184 is compressed or loaded between the partition 186 and tongue 181. Continued rotation of segmental gear 241 brings the end tooth in engagement with the ledge 255 of the pawl 251 moving same against the resistance of spring 253 and out of notch 249. Spring 184 then expands or fires shifting the outer sleeve 178 and consequently the valve stem 177 and valve 176 thereby changing the porting within the main valve casing 174.

Fluid enters the valve casing 174 through inlet port 188 and flows out through either port 189 or 190. As illustrated in Figure 12 outlet port 189 is connected with inlet port 188 through the reduced portion 191 of the valve 176. The valve 176 is provided with a bore 192 which constitutes a common discharge and communicating with the discharge or return lines through ports 193 and 194 in the valve. The casing is provided with discharge ports 195 and 196 respectively connecting with port 193 and the open end 197 of valve bore 192. Outlet port 190 of valve casing 174 is connected by pipe line 198 with inlet port 199 of variable feed valve 200. The variable feed valve 200 comprises a bracket 201 fixed to the side of column 99 having a valve casing 202 containing valve 203. Outlet port 204 of this valve is connected with inlet port 199 through the reduced portion 205 of valve 203. The valve 203 is yieldably urged in one direction by spring 206 which has one end received in a socket 207 in one end of valve 203 and the other end in abutment with closure plate 208. A tapered cut off portion 209 is formed on the valve for gradually cutting off the flow of fluid through the outlet port 204 thereby gradually decreasing the speed of descent of the spindle carrier and cutters into the work. In order to gradually cut off this flow use is made of a lever 210 pivoted at 211 having one end 212 in engagement with one end of the valve 203 and the other end 213 in engagement with a push rod 214. This push rod 214 is supported and guided by a pair of ears 215 extending from the bracket 201 and has its other end contacting with an adjustable cam plate 216 carried by the spindle carrier 97. Collars 217 are carried by the push rod 214 to limit its movement under the influence of spring 206. The cam plate is formed with two straight portions 218 and 219 and an inclined portion 220 connecting the two.

As the spindle carrier and cutter descend toward the work piece the push rod rides against the plain portion 218 of the cam with the variable feed valve open under the influence of spring 206. Continued movement of the carrier brings into play the inclined portion 220, which moves the push rod outwardly and pushes the valve inwardly against the spring 206 and gradually cuts off the flow of fluid the valve gradually cutting down the speed of descent of the carrier as the cutters bite into the work. About the time the push rod reaches the plane portion 219 on the cam plate, the flow through the valve is completely shut off and descent of the carrier stopped. About this time the stops 150 and 170 are in contact with stop blocks 151 and 168 or stop blocks 154 and 169.

The circuit including the valves and controlling the vertical reciprocation of the spindle carrier is diagrammatically shown in Figure 13 and will now be described in detail. Pump 221 withdraws fluid from supply tank 222 and passes same through pipe line 223 to main valve casing 174. Branch line 224 runs from line 223 to the inlet of the hydraulic counter-balance cylinder 131 for maintaining at all times a pressure on one side of piston 132 tending to raise the spindle carrier. The fluid is also directed from the main casing 174 through either lines 225 or 226 depending upon which of the rack plungers 244 or 245 is depressed. As illustrated in Figure 13 the fluid passes through the line 226 to the variable feed valve 200 and then through the line 227 to the lower end of cylinder 100 for raising the piston therein and lowering the spindle carrier and cutters. The fluid is forced out of the upper end of the cylinder 100 through line 228 to the main valve casing 174 and then through ports 189 and 193 into and through the bore 192 to the port 196 and into the discharge line 229 to the supply tank 222. As the table moves beneath the cutters, dog 186 will engage and depress rack plunger 245 shifting the valve 176 so as to connect the inlet port 188 with the port 189. The circuit for the fluid will then be as follows: From pump 221 through line 223 valve casing 174, line 225 to the upper end of cylinder 100. The return flow will then be through line 227 to branch return line 230 to port 195 through valve casing 174 to port 193 and through the bore 192 and port 196 to the supply tank through the return line 229. Also as soon as the spindle carrier rises sufficiently to permit the push rod 214, under the influence of spring 206, to start to follow the incline 220 on cam plate 216, the port 204 will be opened allowing some of the return fluid from the lower end of cylinder 100 to return through pipe 227, variable feed valve casing 202, pipe line 226, main valve casing 174, to port 194 to the bore in the main valve and then the common discharge line. It will be noted that when the piston in cylinder 100 first starts downward, the variable feed valve is closed, thereby necessitating use of the branch return line 230.

From the foregoing description it will be noted that a machine has been provided for automatically performing a plurality of operations or cuts on a plurality of work pieces at a plurality of spaced portions throughout the work piece. It will also be noted that the operations on the work piece may be formed in axial alignment, one with the other, or angularly related, one to the other, as desired.

In addition, suitable means and mechanisms have been provided for determining the amount of cut to be performed as well as the depth thereof with respect to the center axis of the work. Also, suitable means for counter-balancing the weight and overcoming the inertia of the cutters and the carrier so as to enable them to be operated or reciprocated with the least delay and with a minimum of power.

This hydraulic counter-balancing of the cutters is in timed relation with the hydraulically operated means for reciprocating the cutters. It is believed that the construction and operation of a machine will be thoroughly understood from the foregoing description.

What is claimed is:—

1. In a device of the class described, the combination of a horizontal reciprocating table, a vertical reciprocating tool carrier, hydraulic controlled means for vertically reciprocating the tool carrier including a main valve, a variable feed valve, mechanism operable by the reciprocating table for shifting the main valve, and a cam plate carried by the vertical reciprocating tool holder effective on the feed valve for controlling the downward movement of the said tool holder.

2. In a machine tool organization, the combination of a reciprocating table, a vertically reciprocating tool carrier above the table, means for raising and lowering the tool carrier in timed relation with the reciprocation of the table, and means cooperating with the tool carrier for limiting the downward movement thereof, comprising a plurality of different stop blocks adapted to be selectively positioned automatically beneath the tool carrier and to be engaged thereby.

3. In a machine tool organization the combination with a horizontally reciprocating table, of a vertically movable tool carrier, an elevating screw carried by the carrier, a sleeve threadedly received by the elevating screw and provided with external threads, a fixed nut for the external threads of the sleeve, means for locking the screw against rotation, and hydraulic means for rotating the sleeve causing a rotative axial movement of the sleeve and an axial movement of the elevating screw thereby raising and lowering the tool carrier.

4. In a machine tool organization the combination with a horizontally reciprocating table, a vertically reciprocating tool carrier, of means for limiting the downward reciprocation of the tool carrier comprising adjustable stops carried by the carrier, stop blocks adapted to be selectively positioned beneath the stops, a plate for the blocks, a rotatable shaft carried for the plate and means controlled by the table for rotating the shaft for selectively positioning the blocks beneath the stops on the carrier.

5. In a machine tool organization the combination with a horizontally reciprocating table, a vertically reciprocating tool carrier, of means for limiting the downward reciprocation of the tool carrier comprising adjustable stops carried by the carrier, stop blocks adapted to be selectively positioned beneath the stops, a plate for the blocks, a rotatable shaft carried for the plate and a pinion on said shaft, a pair of rack plungers enmeshed with the pinions and adjustable dogs carried by the reciprocating table in alignment with the rack plungers for operating same for rotating the shaft and selectively positioning the stop blocks beneath the stops carried by the carrier.

6. In a machine tool organization the combination with a horizontally reciprocating table, a vertically reciprocating tool carrier, of means for reciprocating said carrier including a cylinder, a piston rod having rack teeth thereon, an elevating screw, means for connecting the piston rod with the elevating screw, a pipe line for conveying fluid under pressure to the cylinder, a main valve in the line, a branch line extending from the main valve to one end of the cylinder, a second branch line extending from the main valve to a variable delivery valve, a line extending from the variable delivery valve to the other end of the cylinder, means carried by the reciprocating table for controlling the main valve and means carried by the tool carrier for controlling the variable delivery valve and the feed of the tool carrier.

7. In a machine tool organization the combination with a horizontally reciprocating table, a vertically reciprocating tool carrier, of means for controlling the rate of reciprocation of the carrier including a cylinder, a pipe line for conveying fluid under pressure to the cylinder, a main valve in the line, a line extending from the main valve to one end of the cylinder, a second line extending from the main valve to a variable delivery valve, a line extending from the variable delivery valve to the other end of the cylinder, a valve stem extending from the main valve having a rack on one end, a pinion enmeshed with the rack, rack plungers enmeshed with the pinion, means carried by the reciprocating table for actuating the rack plungers for shifting the main valve thereby directing the fluid into either the first or second line from the main valve and means for controlling the flow of fluid through the variable delivery valve.

8. In a machine tool organization the combination with a horizontally reciprocating table, a vertically reciprocating tool carrier, of means for controlling the rate of reciprocation of the carrier including a cylinder, a pipe line for conveying fluid under presure to the cylinder, a main valve in the line, a line extending from the main valve to one end of the cylinder, a second line extending from the main valve to one end of the cylinder, a third line extending from the main valve to a variable delivery valve, a line extending from the variable delivery valve to the other end of the cylinder, a valve stem extending from the main valve having a rack on one end, a pinion enmeshed with the rack, rack plungers enmeshed with the pinion, means carried by the reciprocating table for actuating the rack plungers for shifting the main valve thereby directing the fluid into either the first or second line from the main valve, yieldable means tending to hold the variable delivery valve open at all times, a pivoted lever having one end in engagement with the variable delivery valve stem, a push rod in engagement with the other end of the lever, and a cam plate carried by the tool carrier for actuating the push rod and rotating the lever about its pivot for gradually closing the variable delivery valve for varying the feed of the fluid through the variable delivery valve and slowing up the movement of the tool carrier in one direction.

9. In a device of the class described, the combination of a bed, a table reciprocably carried by the bed, a plurality of clamping means on the bed for supporting a plurality of work pieces, indexing means on each work piece, a tool carrier above the work pieces, hydraulic means for reciprocating the tool carrier toward and from the work pieces, means beneath the tool carrier for selectively limiting the descent of the tool carrier, means on the reciprocating table for controlling the reciprocation of the tool carrier, means on the table for controlling the means for limiting the descent of the tool carrier, hydraulic means for counter-balancing the weight and inertia of the tool carrier and a source of fluid supply for the hydraulic means.

10. A milling machine having a reciprocating table, a reciprocating tool carrier associated therewith and movable to and from the table, hydraulic counter balancing means for said tool carrier, hydraulically actuated screw feed means for effecting movement of the carrier, a source of pressure, means to directly connect the counter balancing means with said pressure, and main and auxiliary valve devices for connecting the feeding means with said pressure.

11. A machine tool having a carrier, a feed screw for reciprocation thereof, a piston and cylinder for actuating said screw, a pump, means to connect one end of the cylinder direct with said pump and the opposite end of the cylinder direct to exhaust to effect a rapid traverse movement of the carrier in one direction, a feed valve, and means to connect the feed valve in series with the said opposite end of the cylinder and the pump to effect a feeding movement of the carrier in the opposite direction.

12. A milling machine having a support, a spindle carrier and a work table mounted thereon, hydraulic means for effecting reciprocation of the carrier including a piston and cylinder, mechanical elevating means interposed between the piston and carrier, a source of pressure, a feed control valve, a reversing valve for coupling the feed valve in series between one end of the cylinder and the pressure source to effect feeding of the carrier, and means to shift said reversing valve to connect the opposite end of the cylinder to pressure and simultaneously short circuit said feed valve to effect rapid traverse of the carrier including trip dogs carried by the table, and a load and fire mechanism operably disposed between the dogs and said reversing valve.

13. A milling machine having a support, a column adjacent thereto, a work table slidably mounted on the support, a spindle carrier mounted on the column for movement toward and from the table, mechanical means for causing said movement in predetermined timed relation with unidirectional movement of the table to effect a pattern of varying depth in work carried thereby, an hydraulically actuated device for operating said mechanical means, a trip operable control valve for said device, and dogs carried by the table for actuating said valve.

14. A milling machine having a column structure, a horizontal reciprocating work table carried thereby, a tool carrier slidably mounted on the column for vertical adjustment with respect to the table, variable mechanical stop means for limiting the movement of the carrier toward the work table to thereby effect a milling operation of predetermined pattern during a single stroke of the table, and auxiliary hydraulic means for maintaining the carrier in contact with said stop means.

15. A milling machine having a bed and a column, a tool carrier mounted on the column, a work table reciprocably mounted on the bed for presenting work to a tool supported by the carrier, said carrier being adjustable with respect to the table, stop means for variably limiting the approach of the carrier with respect to the table during a feeding stroke thereof, hydraulically actuated means for maintaining the carrier in contact with the stop means, and additional hydraulic means for counter-balancing the pressure against stop means.

16. In a device of the class described, the combination of a main supporting member, a cutter support and a work support carried by said member for relative movement one with respect to the other along a first path, said parts being also relatively movable along a second path, hydraulically actuated means for effecting movement in one of said paths, a rotatable member operatively coupled to one of the supports for effecting relative movement along the other of said paths, hydraulically actuated means for effecting intermittent rotation of said rotatable member and thereby relative movement of said parts in one path during simultaneous relative movement in the other path, and means carried by the table to determine the timing between said intermittent rotations.

17. In a device of the class described, the combination of a main supporting member, a cutter support and a work support carried by said member for relative movement one with respect to the other along a first path, said parts being also relatively movable along a second path, hydraulically actuated means for effecting movement in one of said paths, a rotatable member operatively coupled to one of the supports for effecting relative movement along the other of said paths, hydraulically actuated means for effecting intermittent rotation of said rotatable member and thereby relative movement of said parts in one path during simultaneous relative movement in the other path, and separate sources of pressure for supplying each of said hydraulically actuated means.

18. In a device of the class described, the combination of a main supporting member, a cutter support and a work support carried by said member for relative movement one with respect to the other along a first path, said parts being also relatively movable along a second path, hydraulically actuated means for effecting movement in one of said paths, a rotatable member for effecting relative movement in both directions between the parts along the other of said paths during uni-directional movement in said one path, hydraulically actuated means for effecting intermittent rotation of said member in opposite direction, and means carried by the table for determining the timing between said intermittent relations.

19 In a device of the class described the combination of a main supporting member, a cutter support and a work support carried by said member for relative movement one with respect to the other along a first path, said parts being also relatively movable along a second path, hydraulically actuated means for effecting movement between the parts in one of said paths, hydraulically actuated means for effecting intermittent movement between the parts along the other of said paths, an independent source of pressure for each of said hydraulically actuated means, hydraulically actuated means for counter-balancing the weight of one of said movable members, and means to connect the counter-balance with one of said independent sources of pressure for actuation thereby.

20. In a machine tool of the class described, the combination of a main supporting member, a cutter support and a work support carried by said member for relative transverse movement one with respect to the other, said parts also being movable along a second path toward and from one another, hydraulically actuated means for effecting movement in a transverse path, a rotatable member for effecting a series of advance and retractive movements between the parts in the second mentioned path, one of said advance movements being greater than the remainder, hydraulically actuated means for effecting intermittent actuation of said rotatable member during uni-directional movement in said transverse path, and variable stop mechanism automatically controlled during uni-directional movement of one of said parts in the transverse path for limiting each of said different approach movements whereby finished surfaces of different depths may be automatically successively machined.

21. In a machine tool of the class described, the combination of a supporting member, a cutter support and a work support carried thereby for relative movement transversely of one another, means to indexibly support a work piece on the work support, hydraulically actuated means for effecting approach and retraction of one of said members relative to the other during uni-directional movement along a transverse path whereby spaced cutting operations may be performed on the work piece, means to index the work between successive cutting operations whereby one of said finished surfaces will be angularly and longitudinally spaced relatively to the other, and stop means for varying said approach movement whereby the successive cuts may be made at different depths.

22. In a machine tool organization the combination of a reciprocating table having a plurality of work clamping fixtures thereon, a tool carrier above the work fixture, a cylinder, a piston rod extending through the cylinder having rack teeth thereon, a carrier elevating screw, a shaft extending from the screw to the piston rod, gearing operatively connecting the piston rod with the elevating screw, a source of fluid pressure, valve means for causing a variable fluid delivery to the cylinder, and motion transmitting means coupled to the valve means and operable by the table for connecting the fluid pressure thereto whereby the tool carrier will be moved at a rapid rate and a subsequent feed rate toward the table.

23. A milling machine having a reciprocating table, a tool carrier movable toward and from the table, fluid operable means for shifting the tool carrier including a reversing valve, a plurality of dogs carried by the table for intermittently operating said valve to cause a plurality of reciprocations of the tool carrier toward and from the table during a single stroke of the table, and means for varying the rate of movement of the carrier during its movement toward the table.

24. A milling machine having a reciprocable table, a tool carrier, a source of pressure, a fluid operable device for shifting the tool carrier relative to the table, said device having a first port connectible to said source for causing movement of the carrier toward the table, and a second port connectible to said source for causing retraction of the carrier relative to the table, a control valve, trip operable mechanism for shifting said valve to alternate said port connections, and a plurality of spaced dogs on the table for intermittently tripping said mechanism during a single stroke of the table.

25. In a machine tool of the class described, the combination of a supporting member, a cutter support and a work support carried by the member for relative transverse movement, fluid operable means for reciprocating the work support, additional fluid operable means for reciprocating the cutter support, means to support a work piece on the work support, control valve means operable by one of said supports for effecting approach and retraction of the other support whereby spaced cutting operations may be performed on the work piece, and means to index the work between successive cutting operations and during unidirectional movement of the work support whereby the finished surface produced by said cutting operations will be angularly and longitudinally spaced relative to one another.

26. A machine tool having in combination a carrier, means for effecting reciprocation of the carrier including a fluid operable motor, a source of pressure, said motor having a first port directly connectible with said source for effecting a rapid movement of the carrier in one direction, a rate control valve, and means to connect the rate control valve in series between the source of pressure and said second port to effect a feeding movement of the carrier in the opposite direction.

WALTER D. ARCHEA